US011847872B1

(12) United States Patent
Post et al.

(10) Patent No.: US 11,847,872 B1
(45) Date of Patent: Dec. 19, 2023

(54) AUTOMATIC PROBLEM DETECTION FROM SOUNDS

(71) Applicant: UIPCO, LLC, San Antonio, TX (US)

(72) Inventors: Nathan Lee Post, San Antonio, TX (US); Carlos J P Chavez, San Antonio, TX (US); Deborah Janette Schulz, San Antonio, TX (US); Ashley Raine Philbrick, San Antonio, TX (US); Eric David Schroeder, San Antonio, TX (US); Gabriel Carlos Fernandez, San Antonio, TX (US); Snehal Desai, Richardson, TX (US); Rachel Elizabeth Csabi, Frisco, TX (US); Ruthie D. Lyle, Durham, NC (US); Courtney St. Martin, Duluth, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/164,193

(22) Filed: Feb. 3, 2023

Related U.S. Application Data

(63) Continuation of application No. 17/017,958, filed on Sep. 11, 2020, now Pat. No. 11,580,796.

(60) Provisional application No. 62/899,194, filed on Sep. 12, 2019.

(51) Int. Cl.
*G07C 5/08* (2006.01)
*G07C 5/00* (2006.01)
*G01M 17/007* (2006.01)

(52) U.S. Cl.
CPC ......... *G07C 5/0808* (2013.01); *G01M 17/007* (2013.01); *G07C 5/008* (2013.01); *G07C 5/0841* (2013.01)

(58) Field of Classification Search
CPC .... G07C 5/0808; G07C 5/008; G07C 5/0841; G01M 17/007
See application file for complete search history.

(56) References Cited

U.S. PATENT DOCUMENTS

| | | | |
|---|---|---|---|
| 10,223,842 B1 * | 3/2019 | Lee | H04L 67/12 |
| 10,323,618 B1 * | 6/2019 | Dudar | F02P 5/1526 |
| 11,521,435 B2 * | 12/2022 | Jung | G07C 5/06 |

(Continued)

OTHER PUBLICATIONS

Non Final Office Action dated Jun. 24, 2022 for U.S. Appl. No. 17/017,958.

(Continued)

*Primary Examiner* — Sizo B Vilakazi
(74) *Attorney, Agent, or Firm* — Plumsea Law Group, LLC

(57) ABSTRACT

A system and a method for diagnosing a problem with a motor vehicle using sound. Ambient noise information for the motor vehicle is determined. Current sound information is received, and whether there is a variation in sound between the current sound information and the ambient noise information is determined. The ambient noise information is subtracted from the current sound information if the variation has been identified, to identify a sound anomaly. A sound anomaly signal is extracted and compared with predetermined anomaly signal information stored in a database. The predetermined anomaly signal information is associated with diagnostic information.

20 Claims, 6 Drawing Sheets

(56) References Cited

U.S. PATENT DOCUMENTS

| | | | |
|---|---|---|---|
| 2005/0024257 A1* | 2/2005 | Britton | G01S 7/412 |
| | | | 342/22 |
| 2015/0137998 A1* | 5/2015 | Marti | G10K 15/02 |
| | | | 340/901 |
| 2020/0020314 A1* | 1/2020 | Keller | G10K 11/17885 |
| 2020/0193735 A1* | 6/2020 | Jung | G05B 23/0281 |
| 2021/0174140 A1* | 6/2021 | DeLuca | G16Y 20/10 |
| 2022/0260458 A1* | 8/2022 | Mian | G06T 7/73 |

OTHER PUBLICATIONS

Notice of Allowance dated Oct. 11, 2022 for U.S. Appl. No. 17/017,958.

* cited by examiner

AUTOMATIC PROBLEM DETECTION FROM SOUNDS

CROSS-REFERENCE TO RELATED APPLICATIONS

This application is a continuation of co-pending U.S. patent application Ser. No. 17/017,958 filed Sep. 11, 2020 and titled "Automatic Problem Detection From Sounds," which claims the benefit of Provisional Patent Application No. 62/899,194 filed Sep. 12, 2019, and titled "Automatic Problem Detection From Sounds". The entire disclosures of which are incorporated by reference herein in their entirety.

BACKGROUND

1. Field of the Invention

The present disclosure relates to problem detection from sounds. In particular, the disclosure relates to automatic problem detection from sounds made by a motor vehicle.

2. Description of Related Art

Motor vehicles are complex mechanical devices that have a large number of moving parts that interact with each other. Vehicles rely on principles of lubrication, friction, hydraulics, and many other mechanical processes to carry out their objective of moving people and goods smoothly over a distance. In performance of their tasks, motor vehicles both wear out parts and make characteristic noises.

With use, a part may fail. Operators of motor vehicles rely on indicia of part failure to attempt to identify a broken or failing part. For example, failure of a part could produce smoke or vapors, flame, and selected odors. Sometimes, failed parts make unusual noises. However, a driver typically does not know which part has failed and whether the failure of this part is a serious safety issue based on unusual noises alone.

Therefore, there is a need in the art for a system and method that addresses the shortcomings of the prior art discussed above.

SUMMARY

In a first aspect, the disclosure is directed to a method for diagnosing a problem with a motor vehicle. In accordance with the method, ambient noise information for the motor vehicle is determined. Current sound information is received, and whether there is a variation in sound between the current sound information and the ambient noise information is determined. The ambient noise information is subtracted from the current sound information if the variation has been identified, to identify a sound anomaly. A sound anomaly signal is extracted and compared with predetermined anomaly signal information stored in a database. The predetermined anomaly signal information is associated with diagnostic information.

In another aspect, the disclosure provides a system for modifying operating characteristics of a motor vehicle. The system includes a mobile system and a remote server in communication with the mobile system. The mobile system includes a smart device and is further configured to identify a sound anomaly in sounds received by the smart device from the motor vehicle, extract a sound anomaly signal, send the sound anomaly signal to the remote server, receive diagnostic and action information relating to the operating conditions of the motor vehicle from the remote server, and send a signal from the smart device to the motor vehicle to adjust one or more motor vehicle operating conditions. The motor vehicle modifies one or more of its operating characteristics in response to receiving the signal from the smart device.

In yet another aspect, the disclosure provides a system for modifying operating characteristics of a motor vehicle including a mobile system comprising a smart device and an on-board diagnostics system. The on-board diagnostics device is electrically connected to the motor vehicle and in wireless communication with the smart device. A remote server in communication with the mobile system.

The mobile system is further configured to identify a variation in sound between current sound information and ambient noise information for the motor vehicle, subtract the ambient noise information from the current sound information to identify a sound anomaly, extract a sound anomaly signal, send the sound anomaly signal to a remote server, and provide optional non-sound information relating to the operating conditions of the motor vehicle from the on-board diagnostics device to the remote server.

The mobile system receives diagnosis and action information from the server. The smart device in the mobile system sends to the on-board diagnostics device a signal providing action information relating to the motor vehicle operating conditions, wherein the on-board diagnostics device changes operating conditions for the motor vehicle in response to the action information.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments are directed to a method for diagnosing a problem with a motor vehicle. Ambient noise information for the motor vehicle is determined. The ambient noise information is the sound profile emitted by the motor vehicle when the vehicle is operating properly. Then, current sound information is received by a smart device, which identifies whether there is a variation in sound between the current sound information and the ambient noise information. The ambient noise information is subtracted from the current sound information if the variation has been identified, to identify a sound anomaly. The smart device extracts a sound anomaly signal and sends it to a database, where the sound anomaly signal is compared to predetermined anomaly signals stored in a database wherein the predetermined anomaly signals are associated with diagnostic information. Optionally, additional information relating to motor vehicle operating conditions may be considered.

Using the exemplary systems and methods, mechanical (or other) problems with a part, or a system of parts, can be detected immediately. This means a driver (or other operator of the motor vehicle) can be informed of any problems right away. This limits the risk of the motor vehicle being driven in an unsafe operating condition. Moreover, this allows failing parts to be identified and fixed before such failures begin to cascade and cause further damage to other parts or systems of a motor vehicle. Moreover, the embodiments allow sound information associated with a particular part or system of parts to be isolated and analyzed to extract diagnostic information. By extracting the noises of particular parts from background noises, the accuracy and precision of the diagnosis can be greatly improved over previous methods.

Figure 1:
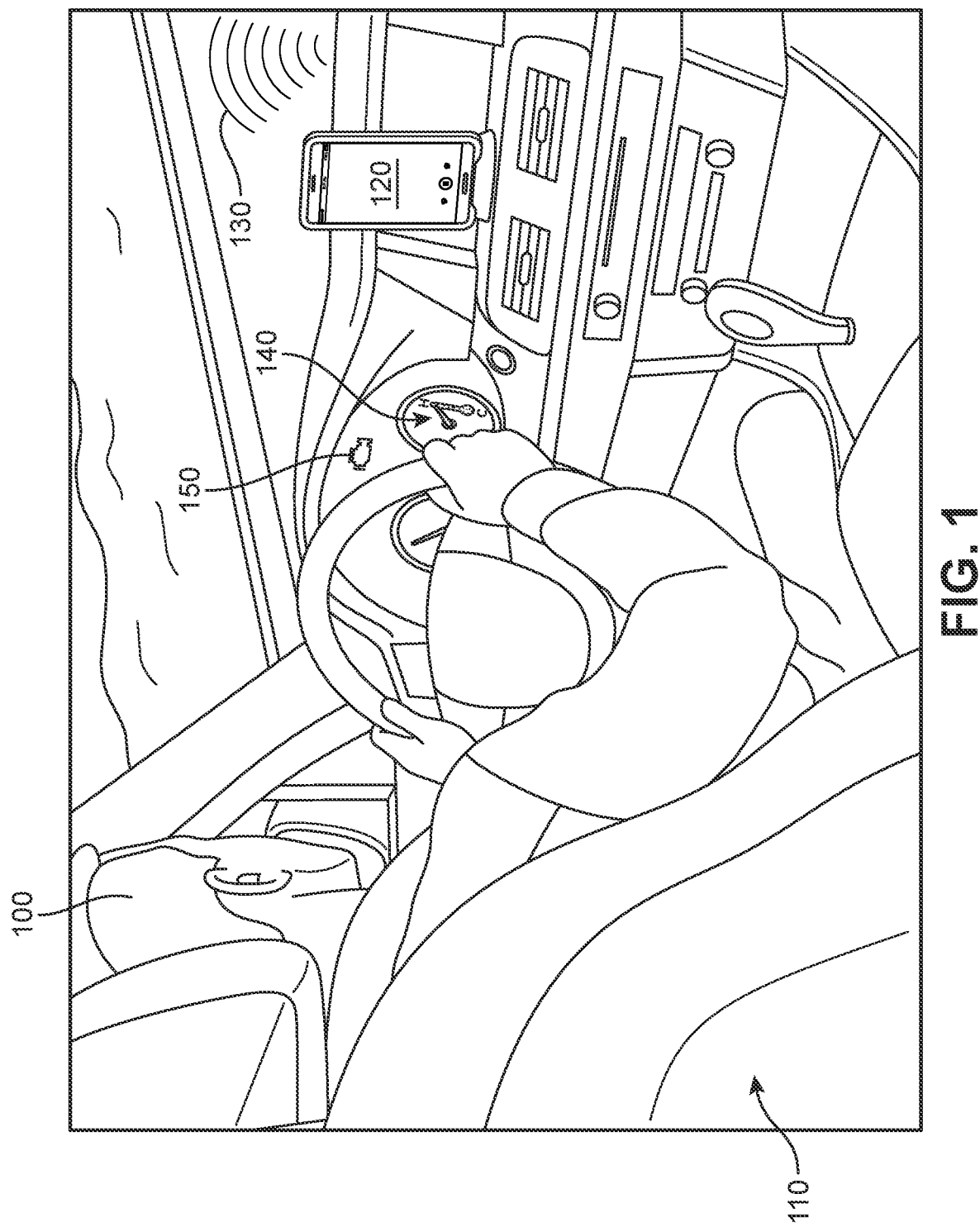
FIG. 1 provides an overview of a problem circumstance as it occurs in a motor vehicle, according to an embodiment.

FIG. 1 illustrates an overview of a problem circumstance occurring in a motor vehicle. User 100 in motor vehicle 110 is driving under conditions that indicate there is a problem with the vehicle. Smart device 120, which recorded ambient noise information for the motor vehicle before the problem arose, now records current sound information as the motor vehicle is used. A smart device may have a microphone, a speaker, a memory, and the ability to receive communications wirelessly, typically by way of at least two modes. Two such modes include Wi-Fi communications and Bluetooth® communication. The motor vehicle may be standing still, as in a parking spot or a garage. In the illustration of FIG. 1, user 100 is driving motor vehicle 110 when the problem circumstance starts.

At least three symptoms are illustrated in FIG. 1. As illustrated at sound indication 130, a noise is coming from under the hood of motor vehicle 110. As can be seen on the dashboard, temperature gauge 140 indicates that the engine temperature is at the highest temperature. Also, "check engine" light 150 is illuminated. Thus, in addition to the noise, there are two indicia or symptoms that optionally may assist in diagnosing the problem with the motor vehicle, as described below.

Figure 2:
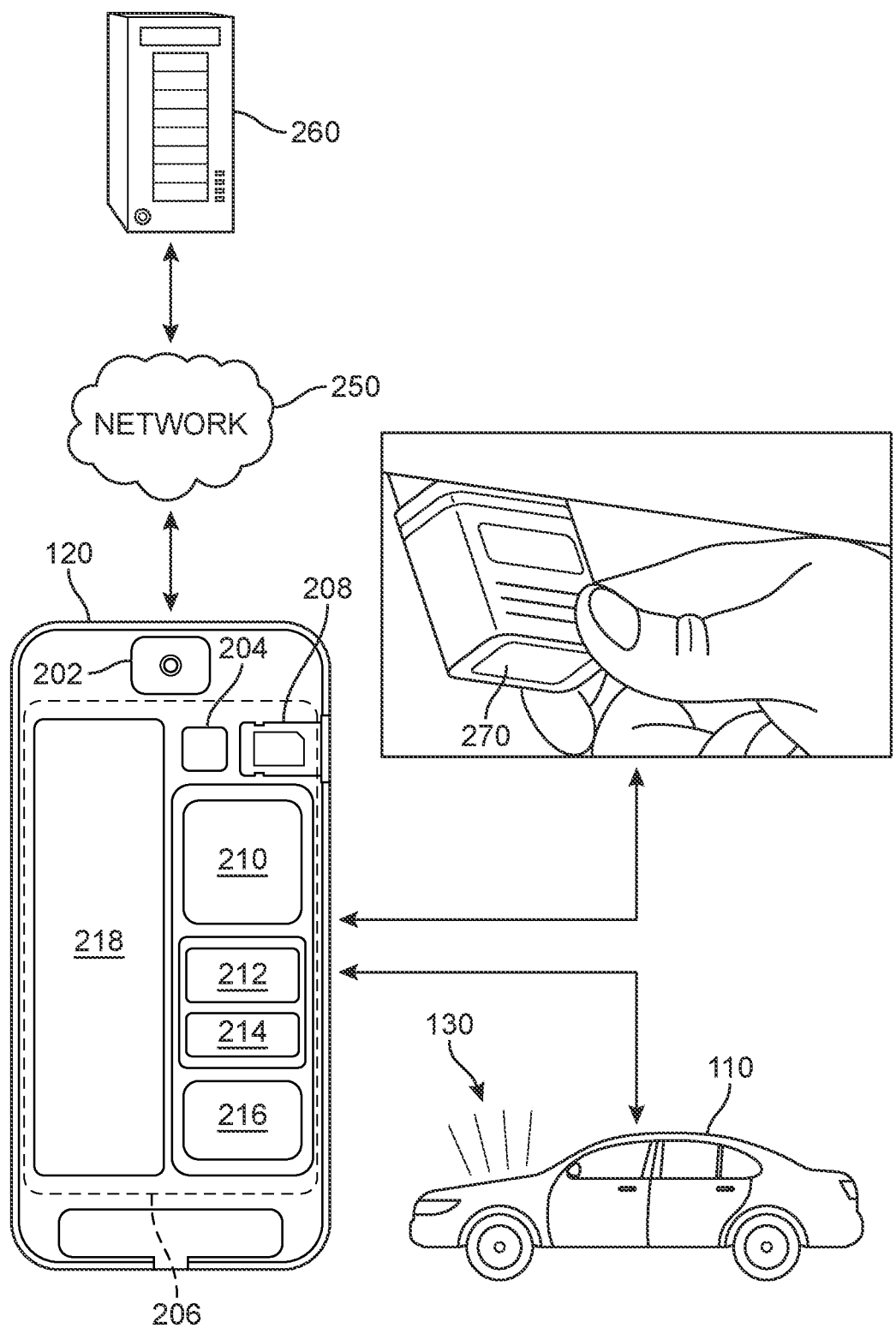
FIG. 2 is a schematic view of a smart device exchanging information relating to a problem circumstance, according to an embodiment.

FIG. 2 is a schematic diagram illustrating communications relating to a problem circumstance such as that described for FIG. 1. Smart device 120 may share information with motor vehicle 110 and network 250 with server 260. Information flowing from motor vehicle 110 provides information to smart device 120 about the sounds or noise emanating at sound indicator 130. Smart device 120 also provides information relating to the sound to network 250, from which server 260 may obtain the information.

Sound information that may be recorded by smart device 120 may include ambient noise information, which is sound information when the motor vehicle is operating properly. Some ambient noise information recordings may be used to establish the ambient noise information database in server 260. Other sound information that may be recorded includes sounds recorded when the motor vehicle is not operating properly. Sound information recorded when the motor vehicle is not operating properly is current sound information.

In some embodiments, current sound information may be identified by the motor vehicle operator, who may recognize that the motor vehicle is not operating properly. In some embodiments, sound anomalies may cause smart device 120 to identify that the motor vehicle is not operating properly. In some embodiments, smart device 120 may recognize a sound anomaly, for example, a sound heard for the first time, and begin recording a sound anomaly. In some embodiments, these ambient noise information and current sound information sound recordings may not be averaged, but rather may be considered individually.

As shown in FIG. 2, smart device 120 includes features found on some smart devices. For example, smart device 120 includes camera 202, which may be used to document optional factors, such as color and quality (density) of smoke or flames, or the location or appearance of a part that malfunctioned. Smart device 120 also includes global positioning system receiver 208, which can provide optional historical and current position and velocity information. Processing unit 210 receives all of the information provided and operates on this information and organizes it for forwarding to network 250. Network 250 then interacts with server 260, storing and recalling information as required. Communication module 212 enables flow of information, such as by cellular circuits, Wi-Fi, Bluetooth®, and near-field communication, between and amongst the information sources, i.e., network 250, on-board diagnostics device 270, and smart device 120. Smart device 120 further includes SIM card 208, memory 214, battery 218, and connection module 216. Connection module 216 enables wired connection of smart device 120 to other devices, to a charger, for example. Each of these features functions in the typical way for a smart device. Information is disclosed on screen 206 of smart device 120.

On-board diagnostics device 270 is a device found in many motor vehicles. The on-board diagnostics device gives access to status of many of the subsystems of the motor vehicle. An on-board diagnostics device may provide both real-time data and information relating to a standard set of diagnostic trouble codes to aid one in troubleshooting malfunctions.

Information that may be supplied from on-board diagnostic device 270 includes the model year, date of manufacture, and make and model of the motor vehicle, together with a representative ambient noise information for the motor vehicle. This information also may be stored in smart device 120 or server 260. This information may make a diagnosis more precise. Motor vehicles of the same make, model, and year tend to make the same sounds, and these sounds often are different from the sounds made by other motor vehicles. For example, the exhaust system often is tuned by a manufacturer to have a distinctive sound. Therefore, the system may make a better diagnosis if the optional contextual non-sound information for the particular make and model of motor vehicle is used in the system.

Modifications may be made to vehicles that directly impact sound output and other potential indicators. If the types of modifications are known, that information may be introduced to the system. This information may aid in reducing misdiagnoses. However, even if none of the make and model information, or the modifications information, is available in the system, the diagnosis may proceed by comparisons of the ambient noise information and the current sound information.

In some embodiments, a method for diagnosing a problem in a motor vehicle involves utilizing software in smart device 120 to obtain historical and current information about the performance of the motor vehicle. In a first part, information is analyzed, and a diagnosis is made in a second part.

Figure 3:
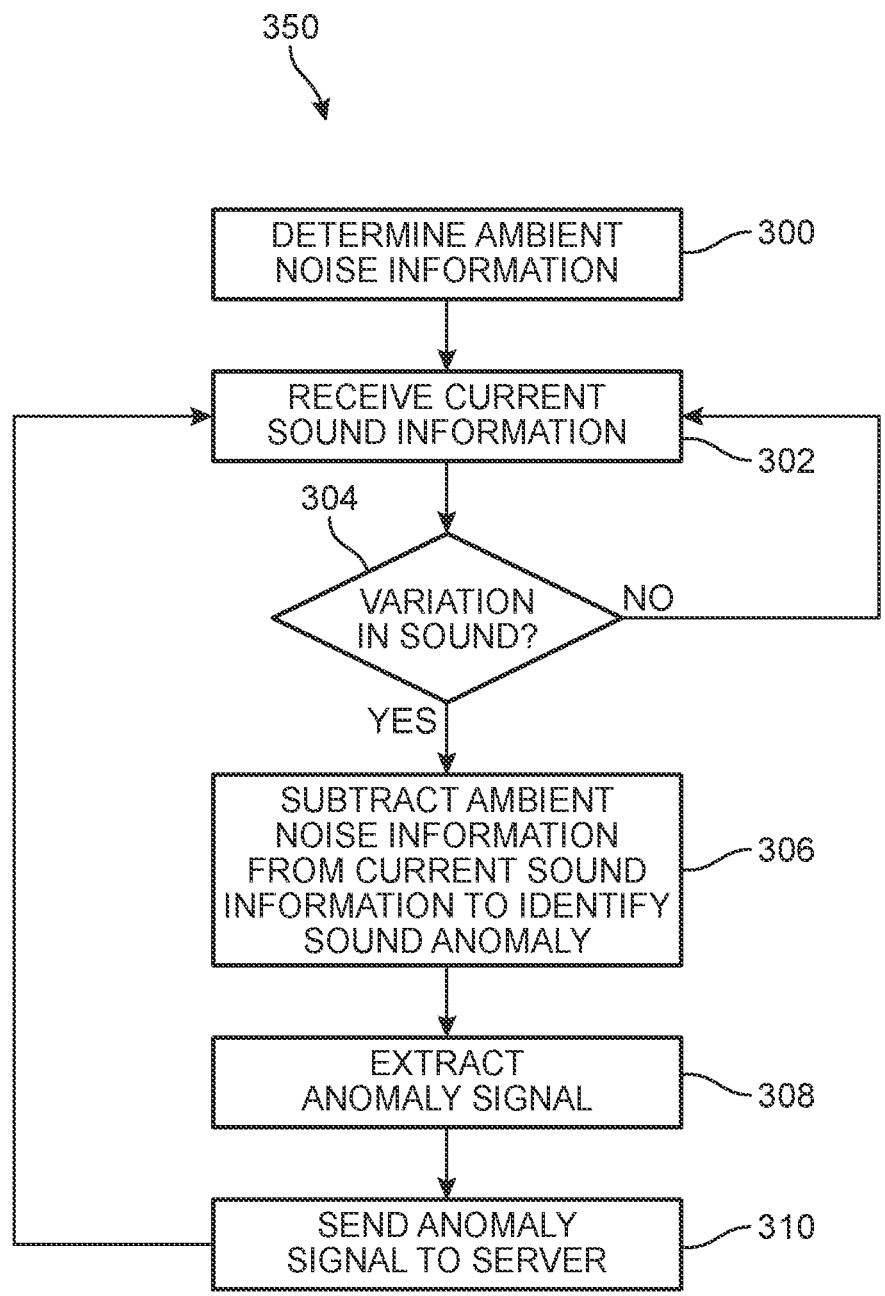
FIG. 3 is a flow chart outlining a process for identification of a sound anomaly, according to an embodiment.

FIG. 3 is a flow chart of embodiments of a method for diagnosing a problem with a motor vehicle. FIG. 3 identifies steps of method 350 for obtaining information necessary to use sound to diagnose a problem with a motor vehicle 110. Specifically, the resultant information is an anomaly signal, which is sent to server 260. In embodiments, ambient noise information is determined for the motor vehicle 110 at step 300 and stored in smart device 120.

In embodiments of method 350, current sound information from operation of the motor vehicle 110 is obtained at step 302 and, like ambient noise information, is stored in smart device 120. This current sound information is the sound made during operation of motor vehicle 110. Current sound information may contain sounds that help identify a problem in the motor vehicle 110. If motor vehicle 110 is malfunctioning, sound emanating from the part or group of parts associated with this malfunction will be captured in the current sound information.

In step 304, the ambient noise information is compared with the current sound information to determine if there is any substantial difference between the two. The ambient noise information and current sound information may be stored in smart device 120. In embodiments, if no variation is found at step 304, method 350 returns to retrieving current sound information at step 302. Determination of whether there is a sound anomaly continues in this way until a sound anomaly is identified at step 304. When a sound variation is found at step 304, the ambient noise information is subtracted from the current sound information to identify or obtain a sound anomaly at step 306. The sound anomaly may be retained in smart device 120.

Smart device 120 then extracts an anomaly signal at step 308. An anomaly signal may include both different sounds and similar sounds, for example, to provide a context, environment, or reference point for the anomalous sounds. At step 310, this anomaly signal is sent to server 260. This anomaly signal may be stored in server 260 and is used as described below. After sending the anomaly signal to server 260, embodiment of the method may again acquire current sound information, as shown in step 302, and continue to monitor for a sound anomaly.

Figure 4:
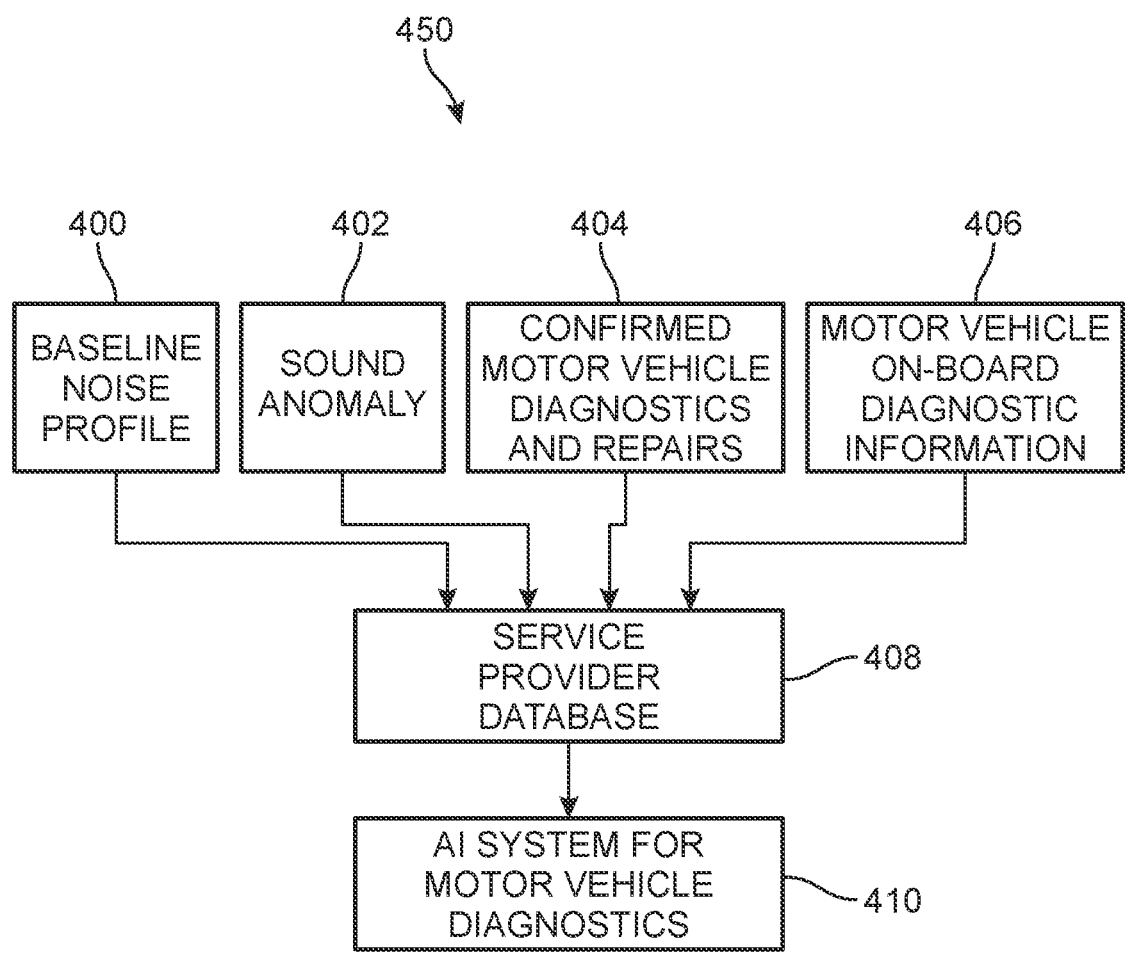
FIG. 4 is a schematic view of a system for exchanging motor vehicle information with a database connected to a central server, according to an embodiment.

FIG. 4 illustrates how information relevant to diagnosing a problem with a motor vehicle is gathered and used. Specifically, a data flow configuration 450 indicates the input information that may be received at a service provided database 408 and used by an AI system 410 to determine motor vehicle diagnostics. As seen in configuration 450, information may be gathered from a number of sources. For example, the ambient noise information or baseline noise profile for motor vehicle 110 is forwarded from smart device 120 to service provider database 408. Smart device 120 accesses the service provider database by way of network 250 and server 260, which also is connected to network 250. In some embodiments, smart device 120 may also forward sound anomaly information 402, through network 250 and server 260 to the service provider database 408.

In some embodiments, the ambient noise and the sound anomaly comprise the audio information relating to motor vehicle 110 and supplied to the service provider database through network 250 and server 260. This information, together with the confirmed motor vehicle diagnostics and repairs 404, which also is forwarded to the service provided database 408, comprises the information required to produce a diagnostic prediction system.

Embodiments are directed to methods and systems for diagnosing problems with motor vehicles using sounds emanating from the motor vehicle. However, it is possible to obtain information from on-board diagnostics device 270 (see FIG. 2). This optional non-sound information may be used to provide a context for the sound information. For example, sounds may be significantly different at 30 mph than they are at 60 mph. Similarly, operating conditions of the engine, for example, whether the engine is running rich or lean, may affect sound measurement. Whereas embodiments are directed to identifying these operating conditions solely by changes in sound, additional context may allow the server to arrive at a conclusion more quickly. Similarly, knowledge of on-board diagnostics device information, such as the fact that the low oil warning light was on, may narrow the scope of searching during diagnosis.

On-board diagnostics device 270 also gathers information about motor vehicle motion, including in particular speed and acceleration. Thus, on-board diagnostics device 270 can be used to gather information such as speed, acceleration, dashboard readings, and the like, that do not emit sound. Also, warnings for the driver, such as "Low oil" or "Check engine" can be obtained from on-board diagnostics device 270. This information may optionally be used during diagnosis.

Other information typically available from on-board diagnostics device 270 may include engine conditions such as coolant temperature, fuel pressure, intake pressure, RPM, throttle position, turbo pressure, and many others that may provide useful information. Other information that may be available includes tire air pressure, air temperature, function of automatic braking systems, and voltage available for the electrical system.

The optional contextual non-sound information optionally is made available from on-board diagnostic information database 406. In some embodiments, information from on-board diagnostics device 270, camera 202, and other sources may be stored in a database associated with server 260 or smart device 120.

The confirmed motor vehicle diagnostics and repairs 404 comprise information from prior incidents. For example, if the prior incident is a faulty part, the diagnostics and repair information may include the identity of the faulty part, the cost of the part and of installation of the part, the cause of the part failure, and any other relevant information about the repair. This information, which is stored on the service provided database 408, is used in an artificial intelligence (AI) system 410 to determine a diagnosis for motor vehicle 110.

More specifically, AI system 410 may learn the relationship between sound anomalies and known diagnostic information for various incidents (such as part failures) by analyzing historical information. Once the AI system 410 has learned these relationships, the AI system 410 may be capable of predicting diagnosis information based on sound anomaly information.

AI system 410 may use any suitable model or collection of models for inferring relationships between sound anomalies and diagnostic information. Exemplary models include, but are not limited to, neural networks, decision trees, regression models, and any other suitable methods.

In some embodiments, a neural network model may provide diagnostic information based on processing the sound anomaly signal presented to identify a diagnosis. In some embodiments, an algorithm model may compare the sound anomaly signal more directly with ambient noise information to find a best match and so to yield the best diagnosis.

The disclosure also relates to a system for modifying operating characteristics of a motor vehicle. The system includes a mobile system and a remote server. The mobile system includes a signal box. After identifying a sound anomaly and sending an anomaly signal to the server, as set forth above, the server sends information to the motor vehicle by way of the smart device and modifies at least one operating characteristics of the motor vehicle. The information from the server is diagnostic information with action information directed to the motor vehicle.

Figure 5:
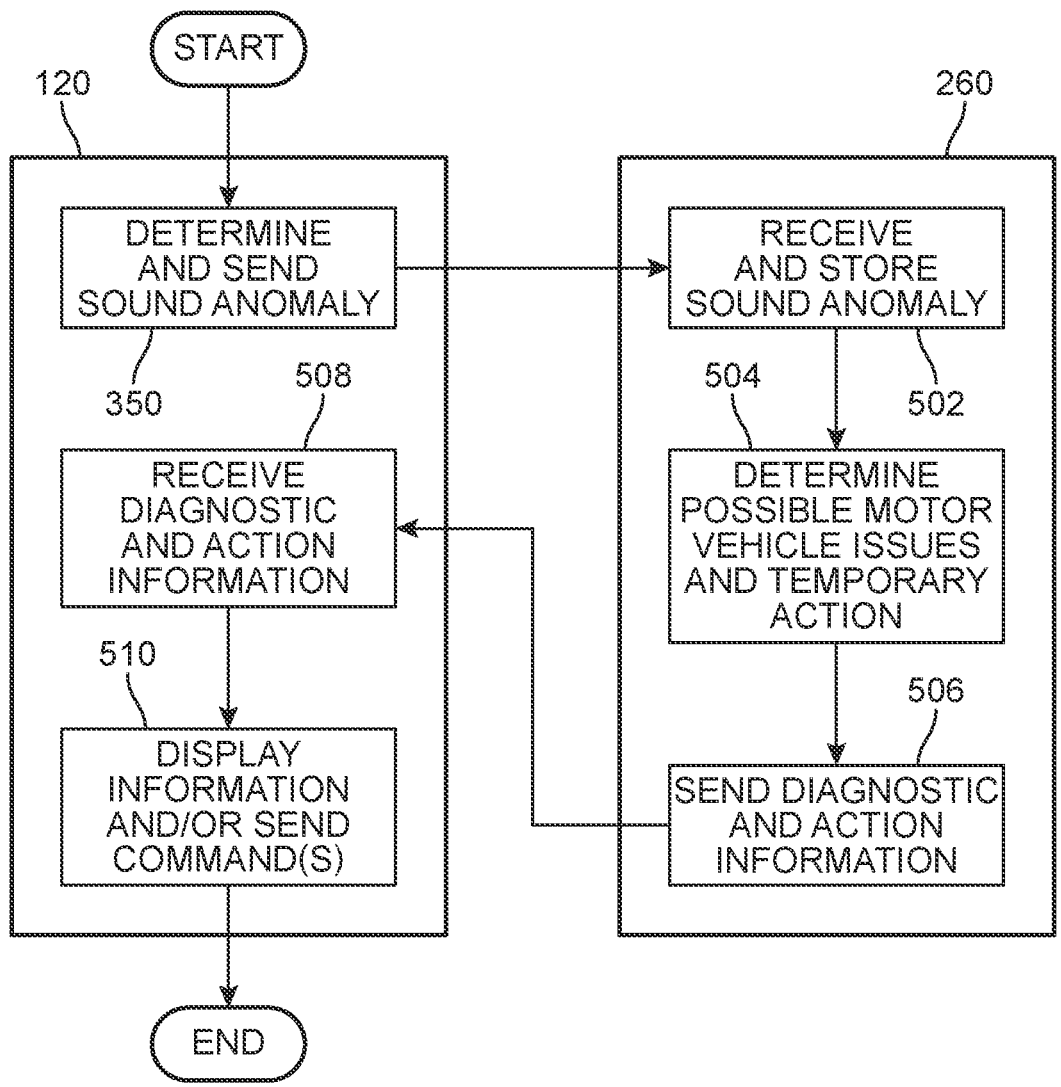
FIG. 5 is a flow chart outlining delivery of information relating to a motor vehicle and the problem circumstance to the server, according to an embodiment.

A flow chart illustrating an embodiment of the system is set forth in FIG. 5. The mobile system includes smart device 120. Server 260 and the interactions between the mobile system and the server are shown in FIG. 5. At the start, an anomaly signal is extracted from the difference between ambient noise information and current sound information, in accordance with method 350. Server 260 receives and stores the sound anomaly signal at step 502. At step 504, server 260 determines possible motor vehicle issues and identifies a temporary action. Server 260 selects diagnosis and action information stored in a database and correlated to an extracted anomaly signal.

At step 506, the information is provided from server 260 to smart device 120 in the mobile system associated with motor vehicle 110. Smart device 120 receives the diagnostic and action information in step 508. In some embodiments, smart device 120 then displays the diagnosis and action information at step 510. In some embodiments, involvement of the smart device 120 is complete, and the user employs the information on the screen to diagnose and repair the problem with motor vehicle 110.

In some embodiments, the information displayed at step 510 may include information about adjusting the operating characteristics of motor vehicle 110. For example, it may be possible to safely drive a poorly performing motor vehicle to a safe place, for example, to a garage for repair. In this way, the driver need not waste time placing a request for a tow truck, and then waiting for the tow truck, if it is possible to proceed at a low speed. Some motor vehicles have a 'limp home' mode, in which the speed is limited, precisely for this purpose. In some embodiments, the motor vehicle operator can review the information provided and decide how to operate the motor vehicle until repairs can be made.

Figure 6:
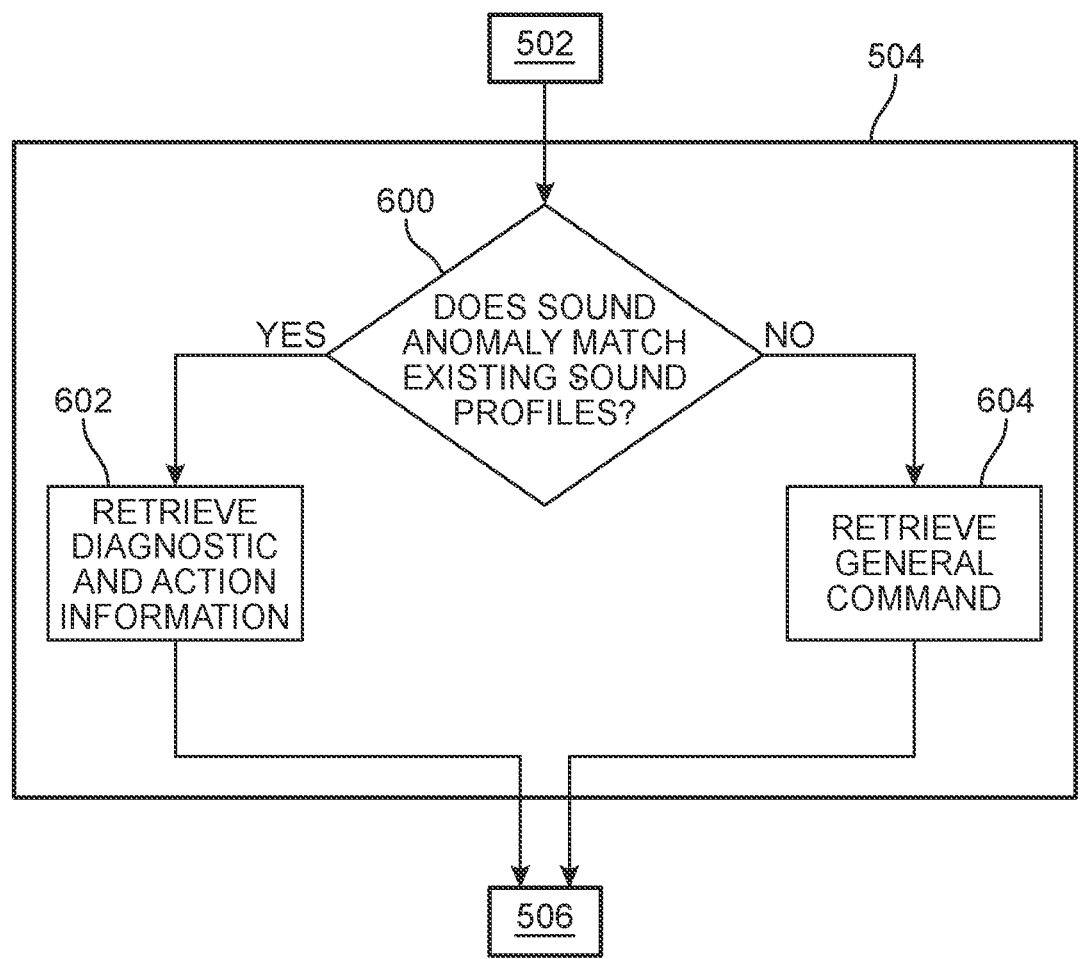
FIG. 6 is a flow chart illustrating information to be provided to the smart device, according to an embodiment.

The flowchart in FIG. 6 illustrates how possible motor vehicle malfunctions are identified in step 504. As set forth in FIG. 6, an anomaly signal has been received and stored in step 502. In step 600, the sound anomaly is matched against the existing sound profiles. In some embodiments, no match is made. In that case, smart device 120 may display a generalized message that no diagnosis can be obtained. The message also may suggest that the motor vehicle be taken to a competent mechanic.

In some embodiments, a match for the motor vehicle anomaly signal is found at step 600. Diagnostic and action information is retrieved at step 602 when server 260 is able to correlate this information with the anomaly signal. Then, either diagnostic and action information or general information is identified by the server and sent, in step 506, to the smart device 120 in the mobile system. Then, the driver may take action after the information is received by smart device 120 and, for example, displayed on display 206. Such action would include, for example, adjusting a device identified in the information from step 510.

In some embodiments, motor vehicle 110 may receive a signal to make a correction from smart device 120. For example, motor vehicle 110 may receive an order to 'limp home'. In some embodiments, the order may come from smart device 120. In some embodiments, the order may come from a human.

The disclosure also relates to a system for modifying operating characteristics of a motor vehicle having an on-board diagnostics device and a mobile system associated with the motor vehicle. The on-board diagnostics device is electrically connected to the motor vehicle and in wireless communication with the smart device. After identifying a sound anomaly and sending an anomaly signal to the server, as set forth above, a signal providing action information relating to motor vehicle operating conditions is sent from the smart device to the on-board diagnostics device. The on-board diagnostics device changes operating conditions of the motor vehicle in response to the action information.

Data and information for embodiments of this system are gathered in accordance with the disclosure above and as described with regard to FIG. 2, FIG. 3, and FIG. 4. The data and information are further processed in accordance with a system such as that disclosed in FIG. 5 and FIG. 6. As disclosed in step 510, commands may be sent instead of or in addition to an information display. In some embodiments, commands may be sent from the smart device 120 to on-board diagnostics device 270, in accordance with step 510. The signal provides action information relating to motor vehicle operating conditions, and the on-board diagnostics device 270 changes operating conditions for the motor vehicle in response to the action information.

For example, in accordance with a command to 'limp home,' on-board diagnostics device 270 may change the maximum speed of the motor vehicle to a relatively low speed, such as 20 mph, 25 mph, or 30 mph. In this way, the motor vehicle may be taken home or to a garage for repairs without the disruption of having to arrange a tow and a ride home if the motor vehicle is taken elsewhere.

The disclosure herein is illustrated with regard to a sedan or saloon model. However, the methods and systems may be applied to any automobile, truck, lorry, or any motor vehicle for which a sound anomaly and current sound information can be obtained.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:
1. A method for diagnosing a problem with a motor vehicle, the method comprising:
receiving a baseline noise profile for the motor vehicle at a service provider database;
receiving sound anomaly information comprising audio information relating to the motor vehicle at the service provider database;
receiving confirmed diagnostics and repairs for the motor vehicle at the service provider database;

forwarding the baseline noise profile, the sound anomaly information, and the confirmed diagnostics and repairs from the service provider database to an artificial intelligence system;

using the artificial intelligence system to predict diagnostic information for the motor vehicle based on the sound anomaly information;

using the predicted diagnostic information to generate action information; and communicating the predicted diagnostic information and the action information to an on-board diagnostic device in the motor vehicle.

2. The method of claim 1, wherein:

receiving the baseline noise profile comprises receiving the baseline noise profile from a smart device; and receiving the sound anomaly information comprises receiving the sound anomaly information from the smart device.

3. The method of claim 1, wherein the method further comprises:

obtaining non-sound information associated with the motor vehicle; and using the non-sound information to provide a context for the sound anomaly information.

4. The method of claim 3, wherein obtaining non-sound information comprises obtaining non-sound information from the on-board diagnostics device in the motor vehicle.

5. The method of claim 3, wherein obtaining non-sound information comprises obtaining non-sound information from an on-board diagnostic information database in the motor vehicle.

6. The method of claim 3, wherein the non-sound information comprises operating conditions of an engine, motor vehicle speed, motor vehicle acceleration, tire air pressure, ambient air temperature, automatic braking system function, voltage, or combinations thereof.

7. The method of claim 1, wherein the method further comprises using the on-board diagnostics device to changes operating conditions for the motor vehicle in response to the action information.

8. The method of claim 1, wherein the confirmed diagnostics and repairs comprises information from prior incidents, identity of faulty parts, costs of parts, costs of part installation, cause of failure of faulty parts, or combinations thereof.

9. The method of claim 1, wherein using the artificial intelligence system to predict diagnostic information comprises learning a relationship between sound anomalies and confirmed diagnostics for various prior incidents.

10. The method of claim 1, wherein using the artificial intelligence system comprises using neural networks, decisions trees, or regression models.

11. The method of claim 1, wherein using the artificial intelligence system comprise comparing the sound anomaly information directly with ambient noise information.

12. A system for modifying operating characteristics of a motor vehicle, the system comprising:

a remote server comprising a service provider database;

memory in a smart device containing software that when executed by the smart device executing software causes the smart device to:

forward a baseline noise profile for the motor vehicle to the service provider database;

forward sound anomaly information comprising audio information relating to the motor vehicle to the service provider database; and forward confirmed diagnostics and repairs for the motor vehicle to the service provider database; and an artificial intelligence system in communication with the service provider database to receive the baseline noise profile, the sound anomaly information, and the confirmed diagnostics and to predict diagnostic information for the motor vehicle based on the sound anomaly information.

13. The system of claim 12, wherein the system further comprises an on-board diagnostics device in the motor vehicle to forward non-sound information associated with the motor vehicle to the artificial intelligence system, the non-sound information providing a context for the sound anomaly information.

14. The system of claim 13, wherein the non-sound information comprises operating conditions of an engine, motor vehicle speed, motor vehicle acceleration, tire air pressure, ambient air temperature, automatic braking system function, voltage, or combinations thereof.

15. The system of claim 13, wherein the non-sound information comprises coolant temperature, fuel pressure, intake pressure, revolutions per minute, throttle position and turbo pressure.

16. The system of claim 13, wherein the confirmed diagnostics and repairs comprises information from prior incidents, identity of faulty parts, costs of parts, costs of part installation, cause of failure of faulty parts, or combinations thereof.

17. The system of claim 12, wherein using the artificial intelligence system comprises using the artificial intelligence system to learn a relationship between sound anomalies and confirmed diagnostics for various prior incidents.

18. The system of claim 12, wherein the artificial intelligence system comprises neural networks, decisions trees, or regression models.

19. A system for modifying operating characteristics of a motor vehicle, the system comprising:

an on-board diagnostics system electrically connected to the motor vehicle;

a remote server comprising a service provider database;

memory in a smart device in wireless communication with the on-board diagnostics system and in communication with the service provider database, the memory containing software that when executed by the smart device executing software causes the smart device to:

forward a baseline noise profile for the motor vehicle to the service provider database;

forward sound anomaly information comprising audio information relating to the motor vehicle to the service provider database; and forward confirmed diagnostics and repairs for the motor vehicle to the service provider database; and an artificial intelligence system in communication with the remote server to receive the baseline noise profile, the sound anomaly information, and the confirmed diagnostics from the service provider database, to predict diagnostic information for the motor vehicle based on the sound anomaly information and to forward the predicted diagnostic information to the remote server;

wherein the smart device receives the predicted diagnostic information and action information from the remote server, the smart device sends a signal providing action information relating to the motor vehicle operating conditions to the on-board diagnostics device, and the on-board diagnostics device changes operating conditions for the motor vehicle in response to the action information.

20. The system of claim 19, wherein the artificial intelligence system learns a relationship between sound anomalies and confirmed diagnostics for various prior incidents to predict the diagnostic information for the motor vehicle.

* * * * *